June 1, 1965 H. J. GERBER 3,186,090

DATA READING APPARATUS

Filed Aug. 4, 1960 6 Sheets-Sheet 1

INVENTOR.
HEINZ JOSEPH GERBER
BY
Teller & McCormick
ATTORNEYS

June 1, 1965 H. J. GERBER 3,186,090

DATA READING APPARATUS

Filed Aug. 4, 1960 6 Sheets-Sheet 2

June 1, 1965 | H. J. GERBER | 3,186,090

DATA READING APPARATUS

Filed Aug. 4, 1960 | 6 Sheets-Sheet 3

DATA READING APPARATUS

Filed Aug. 4, 1960

June 1, 1965 H. J. GERBER 3,186,090

DATA READING APPARATUS

Filed Aug. 4, 1960 6 Sheets-Sheet 6

United States Patent Office 3,186,090
Patented June 1, 1965

3,186,090
DATA READING APPARATUS

Heinz Joseph Gerber, Hartford, Conn., assignor to The Gerber Scientific Instrument Company, Windsor, Conn., a corporation of Connecticut
Filed Aug. 4, 1960, Ser. No. 47,469
21 Claims. (Cl. 33—1)

This invention relates to a data reading apparatus for use in converting data recorded as a curve or trace on a chart sheet into a more convenient form for subsequent use by individuals or other data processing machines. More particularly the invention relates to apparatus for reducing data from a graphical to a tabulated numerical form.

The general object of this invention is to provide a data reading apapratus which is of a simple construction and which is relatively small and light so as to be readily portable.

A more particular object of this invention is to provide a data reading apparatus comprising a reading head and a separate power and readout unit adapted to be placed in a convenient out of the way position relative to the reading head, the reading head being adapted to be placed over a chart sheet held in a fixed position and having such controls thereon that a complete set of readings may be made from the chart sheet without attention to the power and readout unit.

Another object of this invention is to provide a data reading apparatus of the character mentioned in the last paragraph wherein the power and readout unit is adapted to supply a printed record in tabulated numerical form of the readings taken by the reading head.

A further object of this invention is to provide a data reading apparatus for use in converting graphical data to a tabulated numerical form and which may be employed with either a straight hairline indicator, with an overlay indicator having a calibrated line thereon for producing linearized results, or with two straight hairlines and a calibration sheet for producing linearized results.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

*General organization*

Figure 1:
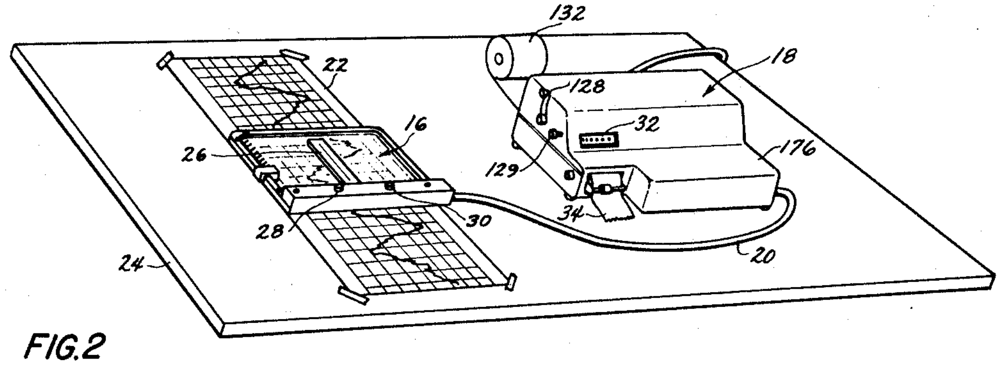
FIG. 1 is a perspective view of a data reading apparatus embodying this invention.

The general organization of a data reading apparatus embodying this invention is shown in FIG. 1 to include a reading head 16, a power and readout unit 18 and a flexible connecting element 20. As shown in the figure, the apparatus is used with a chart sheet 22 held in a fixed position on a flat table 24 by pressure sensitive tape or other suitable means. The reading head 16 is movable relative to the power and readout unit 18 and is adapted to be placed over the chart sheet 22 and manually shifted into a proper reading relationship therewith. The power and readout unit 18 may be placed on the table at a convenient out of the way location to avoid interference with the use of the reading head. The chart sheet 22 may be an oscillogram sheet or any of various other types of graph or chart sheets having data recorded thereon in the form of a curve or trace. The reading head 16 is not necessarily limited to use with chart sheets held in a fixed position in the manner shown in FIG. 1 but may also be attached to various suitable chart sheet transport devices used for displaying and viewing elongated chart sheets which are folded or wound on spools.

The reading head 16 in FIG. 1 is shown positioned for reading the amplitudes of an oscillogram trace recorded on the chart sheet 22. An indicator 26 is movable transversely of the chart sheet and has a hairline adapted to be brought into registration with selected points on the oscillogram trace. Movement of the indicator is controlled from the reading head by a speed control switch 28, and after the indicator is moved into registration with a selected point a printed record of its displacement from a given reference position is obtained by operation of a print switch 30 also located on the reading head.

Power for moving the indicator 26 is supplied to the reading head by means of a flexible drive shaft within the connecting element 20. The connecting element also includes electrical conductors connecting the switches 28 and 30 with electrical control elements within the power and readout unit. In addition to a motor for driving the reading head indicator 26, and a suitable electrical control circuit, the power and readout unit 18 also includes a readout device in the form of a printing counter. At the window 32 the printing counter displays a number having a value related to the displacement of the indicator 26 from a given reference position, and it is also actuatable to print the displayed number on a paper record strip 34. Thus, if the indicator hairline is in registration with a point on the curve being read the displayed number will be related to the amplitude of the curve at that point with respect to the given reference line. For purposes of simplification these numerical values will hereinafter be referred to at times as "amplitude numbers." In use the printing counter is actuated each time the indicator 26 is moved into registration with a selected point on the curve being read and functions to print the amplitude numbers in tabulated form together with associated timing counts or sequential numbers indicating the order in which the readings were taken, so that each amplitude number is easily identified. If the readings are taken progressively along the longitudinal axis of the chart sheet at equally spaced increments, the timing counts will also be related to, and thus serve to indicate, the value of the time or other parameter associated with each amplitude number. Because of this the timing counts are also often referred to as "X-axis values," the amplitude numbers being considered "Y-axis values."

*Reading head*

Figure 2:
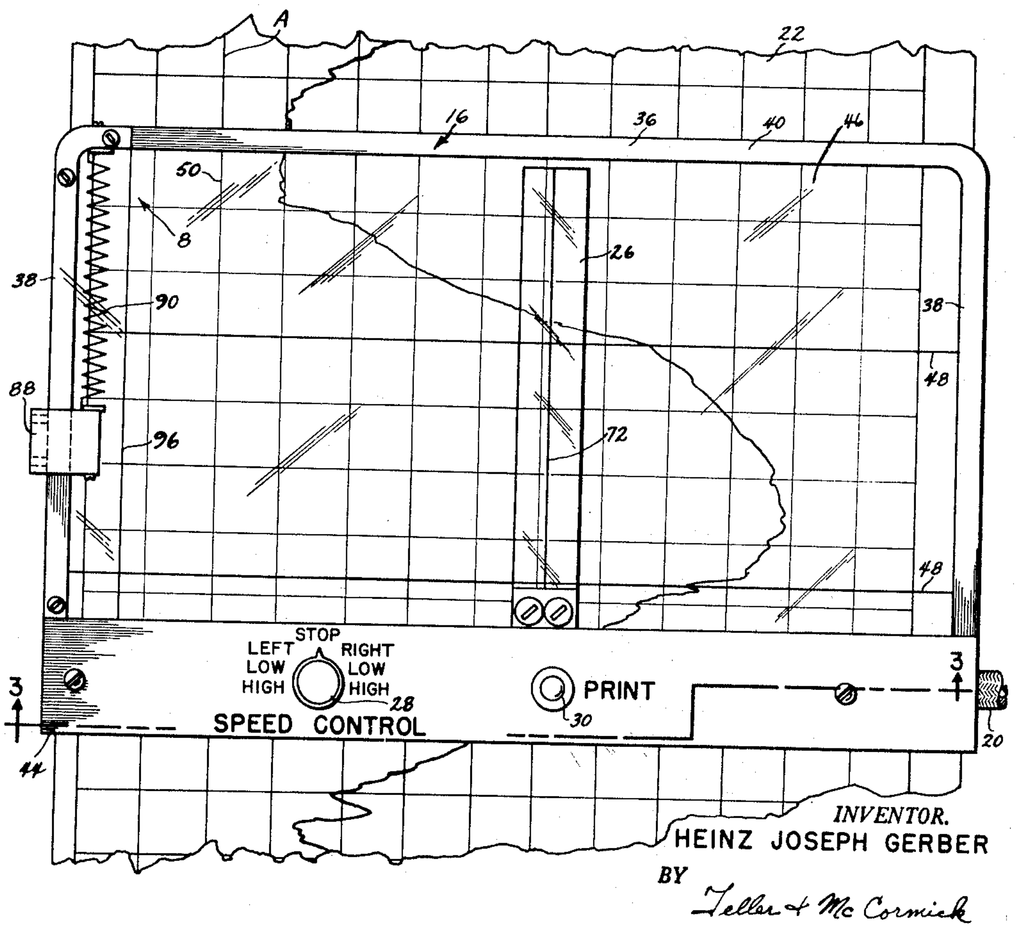
FIG. 2 is an enlarged plan view of the reading head employed in the data reading apparatus of FIG. 1.

Referring more particularly to FIGS. 2 to 6, the reading head 16 includes a generally rectangular frame 36 having two narrow side portions 38, 38, a narrow rear portion 40, and a front portion 42. The front portion of the frame supports the mechanism for moving the indicator 26 and is provided with a suitable cover 44 which extends along the full length of the front of the reading head as shown in FIG. 2. The frame 36 supports a flat bottom plate 46 which extends over the full area enclosed by the frame. The bottom plate is attached along its margin to the frame 36 and is made from a transparent or translucent light transmitting material, such as glass or plastic, through which the chart sheet 22 may be viewed. As shown best in FIG. 6, a plurality of horizontal hairlines 48, 48 and a plurality of vertical hairlines 50, 50 are inscribed on the bottom plate 46. These hairlines are fixed relative to the frame 36 and serve as indicators for bringing the reading head into proper reading relationship with the chart sheet 22 through the process of adjusting the reading head to bring one of the hairlines into registration with one of the dividing lines of the chart sheet.

Figure 3:
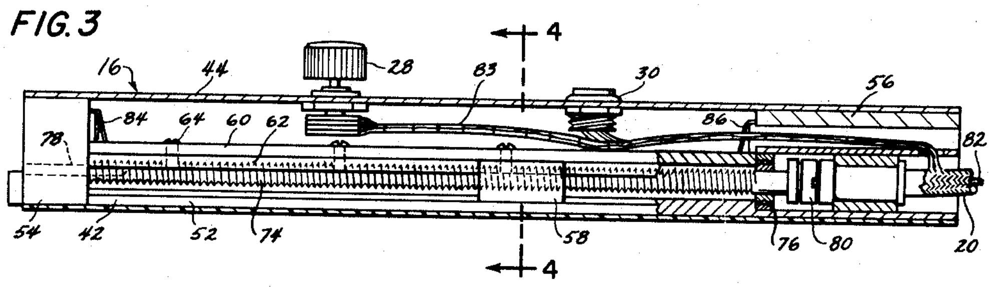
FIG. 3 is a vertical sectional view of the reading head taken on the line 3—3 of FIG. 2.
Figures 4, 6:
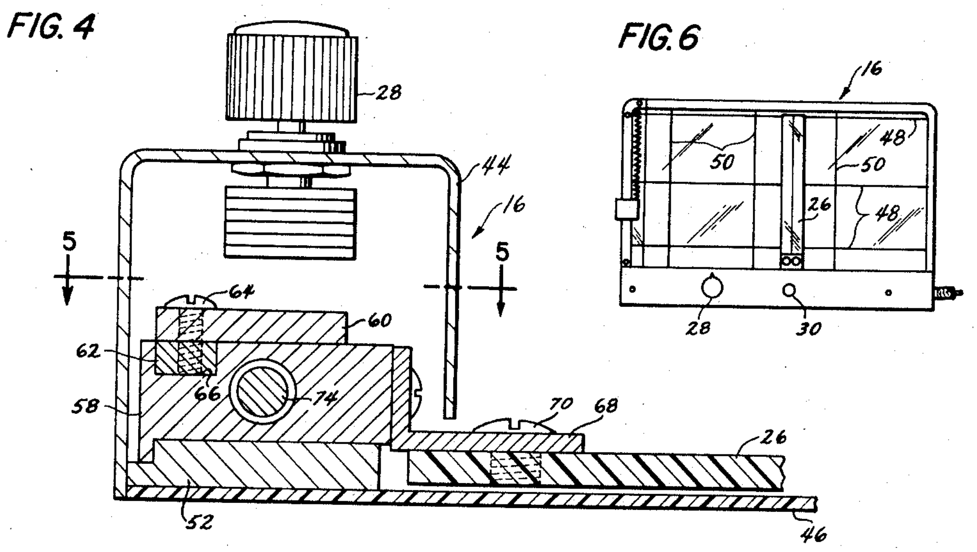
FIG. 4 is a vertical sectional view of the reading head taken on the line 4—4 of FIG. 3.
FIG. 6 is a reduced plan view of the reading head showing the hairlines provided on the bottom plate for aligning the head with a chart to be read.
Figure 5:
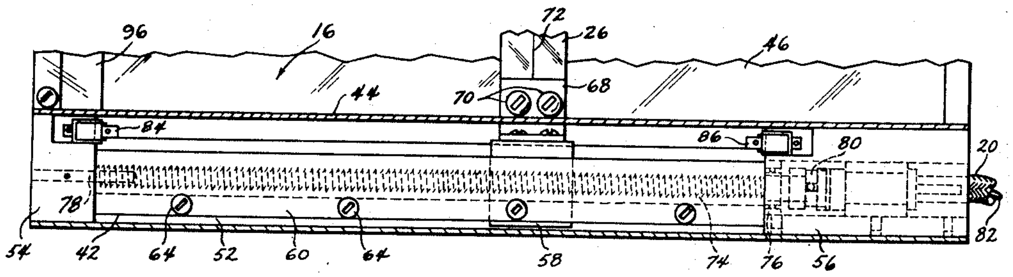
FIG. 5 is a horizontal sectional view of the reading head taken on the line 5—5 of FIG. 4

The front portion 42 of the frame 36, as shown in FIGS. 3 to 5, includes an elongated slide plate 52, extended between a left-hand corner block 54 and a right-hand corner block 56, which slidably supports a slide 58. The slide 58 is held vertically in place on the slide plate 52 by engagement with a hold-down bar 60 coextensive with the slide plate and supported in spaced relationship therewith by the corner blocks 54 and 56. A guide bar 62 is removably attached to the hold-down bar 60, as by a number of screws 64, 64, and fits within a slot 66 in the slide. Thus, the slide is guided by the guide bar and slot for rectilinear sliding movement along the slide plate 52. Mounted to the slide 58 for movement therewith is a bracket 68 which extends rearwardly beyond the cover 44 and has two openings receiving two screws 70, 70 for attaching the indicator 26 to the bracket, as shown in FIGS. 2 and 4. The bracket supports the indicator in very closely spaced relationship to the top surface of the bottom plate 46. The indicator 26 illustrated in FIG. 2 comprises a relatively narrow strip of light transmitting material having a straight hairline 72, which hairline is preferably located on the bottom surface of the indicator to minimize parallax. The indicator however may take various other forms, one of which is hereinafter described, without departing from the invention, and if desired the hairline may be omitted and one of the edges of the indicator used instead for reading the chart sheet.

Movement of the indicator 26 relative to the other parts of the reading head 16 is effected by a lead screw 74 located between the slide plate 52 and hold-down bar 60 and threadably engaged with the slide 58. The slide 58 in effect serves as a nut threaded on the lead screw 74 and is moved in one direction or another along the slide plate 52 when the lead screw is rotated in one direction or the other about its longitudinal axis. The lead screw is supported for rotation about its longitudinal axis, which is parallel to the path of the slide 58, by a ball bearing unit 76 adjacent its right-hand end and by a spindle bearing 78 adjacent its left-hand end. These bearings serve not only to rotatably support the lead screw about its longitudinal axis but also to prevent axial movement thereof. The outer race of the ball bearing unit 76 is press fitted into the right-hand corner block 56 and the inner race is press fitted onto the right-hand end portion of the lead screw. The right-hand end portion of the lead screw extends some distance to the right beyond the ball bearing unit 76 and is connected with a coupling 80, which coupling is in turn connected with the flexible drive shaft 82 of the flexible connecting element 20 so that rotation of the flexible drive shaft is transmitted through the coupling to the lead screw. The spindle bearing at the left-hand end of the lead screw comprises a spindle fixedly secured to the left-hand corner block 54 and received in an axial opening in the left-hand end of the lead screw as shown in FIG. 5. From the foregoing it will be apparent that a given angular displacement or rotation of the lead screw 74 by the flexible drive shaft 82 will cause a corresponding proportionate rectilinear movement of the slide 58 and indicator 26. That is, the rectilinear displacement of the indicator 26 from a given starting position will be directly related to the angular displacement of the lead screw and flexible shaft from a corresponding starting position.

As mentioned previously, the movement of the indicator 26 is controlled from the reading head 16 by the speed control switch 28, and the printing of the amplitude numbers on the paper record strip is controlled by the print switch 30. Both of these switches are attached to the cover 44 of the reading head 16 as shown in FIGS. 2 and 3, and have associated therewith a number of electrical conductors, indicated generally at 83, as shown in FIG. 3. The conductors extend from the switches through a portion of the right-hand corner block 56 and are then combined with the flexible drive shaft 82 in the flexible connecting element 20 so as to extend to the power and readout unit 18. That is, the conductors 83 in the connecting element 20 surround the flexible drive shaft and are located between the drive shaft and the outer sheath or covering of the connecting element. This arrangement is not however essential to the invention and if desired the conductors may be separate from the drive shaft. As shown in FIG. 2, the speed control switch 28 is selectively movable between various positions at which the movement of the indicator 26 is stopped or at which the indicator is moved either to the right or to the left at a high or low speed. In addition, the reading head also includes two limit switches 84 and 86 located respectively adjacent the left and right-hand sides of the frame 36. The limit switches have operating arms adapted to engage the bracket 68 when the slide is moved sufficiently far to the right or left along the slide plate 52. When actuated, the limit switches interrupt the electrical circuit to the drive motor in the power and readout unit 18 and thereby prevent further movement of the lead screw 74 and indicator 26. The operation of the various switches on the reading head will be more fully described hereinafter in connection with the electrical circuit.

Figure 7:
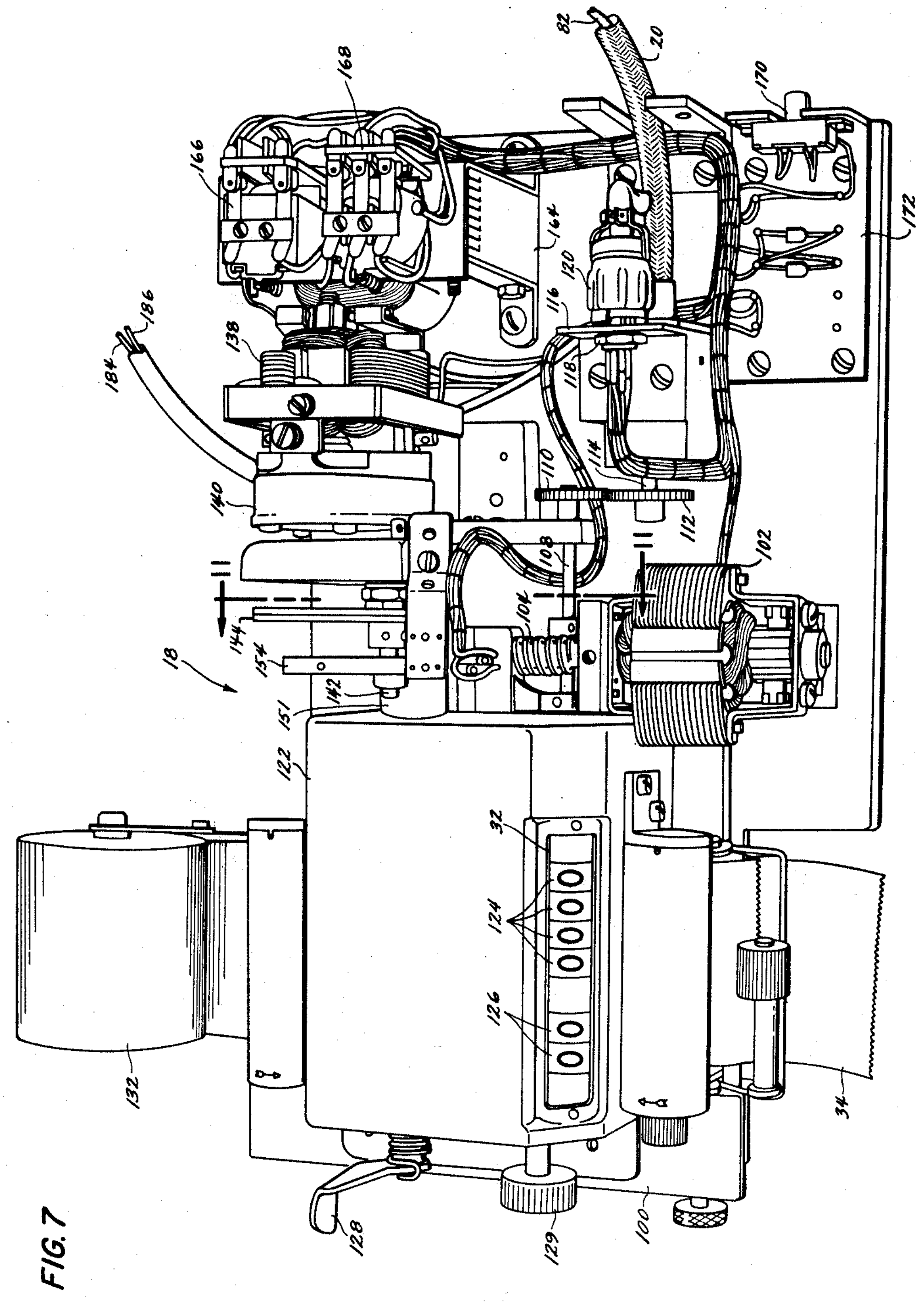
FIG. 7 is an enlarged perspective view of the power and readout unit employed in the data reading apparatus of FIG. 1, the unit being shown with its cover removed.
Figure 8:
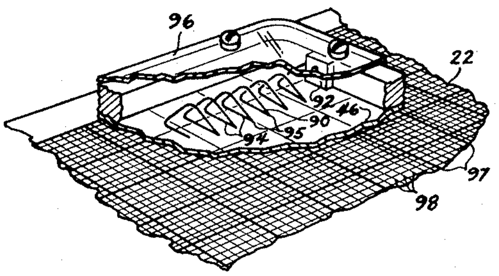
FIG. 8 is a fragmentary perspective view taken in the direction of the arrow 8 in FIG. 2 and showing a portion of the variable scale device attached to the reading head.

The reading head 16 also preferably includes a variable scale device for dividing a given longitudinal extent of the chart sheet 22 into a number of increments of equal length. For example, if the curve or trace recorded on the chart sheet is of a cyclical nature, such as an oscillogram trace, the variable scale device may be employed to divide a cycle or half cycle of the curve into a plurality of equally spaced divisions at each of which the curve is to be read. As shown in FIGS. 2 and 8, the variable scale device includes a slide 88 carried by the left-hand side portion 38 of the frame 36 and guided thereby for longitudinal movement relative thereto, the slide being manually movable along the frame side portion 38 and adapted to hold or maintain the position to which it is moved. A longitudinal extensible coil spring 90 is connected at its rear end with a bracket member 92 fixed to the rear portion 40 of the frame and is connected at its forward end with the slide 88. When the slide 88 is moved, the length of the spring 90 is increased or decreased. The spring 90 has its convolutions uniformly spaced, and the spacings between all of the convolutions are varied when the length of the spring is increased or decreased. As shown in FIG. 8, the spring convolutions are preferably of a generally triangular shape. The spring 90 is so located that the straight or substantially straight portions 94, 94 are parallel with and in close proximity to the top of the bottom plate 46. The convolutions are relatively sharply bent and the spring therefore has longitudinally aligned relatively sharp corner portions 95, 95 which are at the bottom thereof. These corner portions 95, 95 are at the right of the spring 90, as viewed in FIGS. 2 and 7, and constitute graduations along the length of the spring. To protect the spring 90 against damage a transparent cover 96 of plastic or the like is mounted on the frame 36 in spaced relation to the spring, as shown in FIG. 7.

Figure 9:
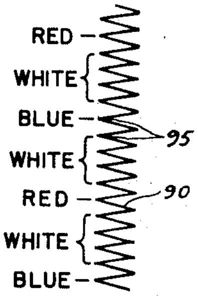
FIG. 9 is a fragmentary plan view of the extensible spring employed in the variable scale device.

To facilitate the use of the spring 90 it is desirable that the user be able to readily select or identify the several graduations provided by the convolutions thereof regardless of the amount of the spring extension. To this end the graduations may be at least partially identified by colored markings, and FIG. 9 shows one pattern of suitable markings. For clarity the spring has been shown somewhat schematically in FIG. 9 and it is to be understood that the colored markings are applied to the convolutions of the spring at the corner portions 95, 95. The "0" graduation and all graduations that are multiples of "10" have the same color markings which may be red. All intermediate graduations which are multiples of "5" have another marking which may be blue. All other graduations have markings which may be white. Preferably, the intermediate graduations which are not "10" and "5" have shorter markings for increased convenience of reading. The variable scale device is most conveniently used in conjunction with a chart sheet, such as that shown in FIG. 8, having a plurality of principal transverse dividing lines 97, 97 and a plurality of more closely spaced secondary dividing lines 98, 98 located between the principal lines. In the use of the spring 90 of the variable scale device, the spring is extended and the reading head so located relative to the chart sheet 22 that a given number of convolutions of the spring will be located along a given length of the chart sheet, such as a length corresponding to one cycle of the curve. The corner portions 95, 95 of the spring will therefore indicate equal divisions along such length and will register with certain ones of the transverse dividing lines 97, 97 or 98, 98 to indicate at which of these lines the desired curve readings are to be made. Although the spring 90 is shown in FIG. 2 to be positioned adjacent and parallel to the left-hand frame side portion 38, it is to be understood that it could also be similarly located adjacent to and parallel to the right-hand frame side portion 38. Also when the reading head is employed with an overlay indicator or with two straight hairline indicators to produce linearized results, as hereinafter described, it is generally desirable to have the spring disposed parallel to the rear and front frame portions 40 and 42. Such an arrangement is, for example, shown in FIGS. 15 and 16 where the spring 90 is positioned parallel and adjacent to the rear frame portion 40 with the slide 88 being movable relative thereto to adjust the spring length.

For example, suppose it is desired to make ten readings at equally spaced intervals along the length of a selected cycle of a curve appearing on the chart sheet 22. The spring 90 and the reading head may then be adjusted so that one of the red corner portions 95, 95 registers with the line 97 or 98 associated with the start of the cycle and so that the next adjacent red corner portion registers with the line 97 or 98 at the end of the cycle. The intermediate white and blue corner portions will then register with other lines 97 or 98 which divide the cycle into ten divisions of equal length and at which the curve should be read.

*Power and readout unit*

Reference is now made to FIG. 7 for a detailed description of the construction of the power and readout unit 18. As shown in this figure, the readout unit comprises a frame or base 100 having mounted thereon a drive motor 102. The motor 102 is preferably a reversible direct current motor and includes a rotatable output member in the form of an armature having a worm gear 104 connected to the outer end thereof. The worm gear 104 is drivingly connected to the flexible drive shaft 82 in the flexible connecting element 20 so that a given angular displacement of the worm gear will result in a corresponding angular displacement of the drive shaft 82 and lead screw 74 and a corresponding rectilinear displacement of the reading head slide 58 and indicator 26. The driving connection between the worm gear 104 and the flexible drive shaft 82 includes a gear 106 which is intermeshed with the worm gear 104 for movement thereby and is fixedly secured to a shaft 108 supported for rotation about its longitudinal axis relative to the frame 100. On the right-hand end of the shaft 108 is a gear 110 which intermeshes with another gear 112 fixedly secured to the left-hand end of a shaft 114. The shaft 114 is rotatably supported by a bracket 116 fixed to the frame 100 and is drivingly connected by a suitable coupling member to the flexible drive shaft 82. The bracket 116 also supports an electrical connector element 118 which cooperates with another connector element 120 on the end of the flexible connecting element 20 to provide electrical connection between the conductors in the flexible connecting element and the conductors of the control circuit contained within the power and readout unit 18. Both the electrical connector element 120 and the flexible drive shaft 82 are preferably disconnectible from the bracket 116 so that the flexible element 20 may be completely detached from the power and readout unit to facilitate movement of the apparatus from one location to another.

Also mounted on the frame 100 is a readout device in the form of a printing counter 122 which serves to measure the displacement of the output member or worm gear 104 of the drive motor and to provide a digital readout in both the form of a continuous visual display and a printed record having numerical values related to the displacement of the output member. The printing counter 122 by itself forms no part of this invention and may be any one of several commercially available units. Insofar as the present invention is concerned it is sufficient to note that the printing counter is drivingly connected to the motor by the worm gear 104 through the gear 106 and the shaft 108, which shaft serves as the input for the counting or measuring mechanism of the printing counter. Adjacent the window 32 the printing counter has a plurality of numbered dial wheels which provide the continuous visual readout. In the illustrated case the printing counter has four dial wheels 124, 124 at the right side of the window which are controlled by the angular displacement of the shaft 108 and two dial wheels 126, 126 at the left side of the window which indicate the timing count. That is, the movement of the four dial wheels 124, 124 is effected by the rotation of the shaft 108 so that the numerical value displayed thereby will be related to the displacement of the shaft from a given reference position, while the two wheels 126, 126 are moved in response to the actuation of the printing mechanism of the printing counter with the result that each time the printing mechanism is operated one or both of the wheels 126, 126 will be moved to display a new consecutive number or timing count. The printing counter 122 also has a lever 128 on the left-hand side thereof by means of which the dial wheels 124, 124 may be zeroed at any position of the shaft 108. That is, by actuating the lever 128 the four dial wheels 124, 124 may be made to read zero, and thereafter these wheels will indicate a numerical value directly related to the total angular displacement of the shaft 108 from the position of the latter at the time of the zeroing operation. Also included on the printing counter is a knob 129 which may be turned to zero the two dial wheels 126, 126. After being zeroed, the dial wheels 126, 126 are automatically indexed one count each time the print mechanism of the printing counter is actuated.

From the foregoing, it will be understood that the number displayed by the four dial wheels 124, 124 is directly related to the angular displacement of the shaft 108 from a given reference position and also, since the shaft 108 drives the flexible shaft 82, that the displacement of the shaft 108 from such reference position is in turn directly related to the rectilinear displacement of the indicator 26 from a corresponding reference position along its path of movement relative to the other parts of the reading head 16. Therefore, the number displayed by the dial wheels 124, 124 is also a direct indication of the displacement of the indicator 26 from its reference position. If the dial wheels are zeroed when the indicator 26 is registered with a given reference position on the chart sheet 22 the number displayed by the dial wheels 124, 124 will be directly related to the displacement of the indicator from such reference position. Accordingly, if such reference position is chosen to correspond to the zero amplitude value of the curve to be read, the number displayed by the dial wheels 124, 124 will be directly related to the amplitude of the curve at a given point along the longitudinal axis of the chart sheet when the indicator is moved into registration with the curve at that point. The dial wheels 124, 124 thus display a number, referred to above as an amplitude number, which is proportionately related to the amplitude of the curve at the point of registration between the indicator and the curve.

For ease in interpreting the results of the curve reading process, the two gears 110 and 112 are preferably so selected that the number displayed by the dial wheels 124, 124 will read directly in units of length based on the movement of the indicator 26 relative to the chart sheet 22. For example, the gears 110 and 112 could be of such a ratio that the dial wheels 124, 124 read one millimeter per unit count. That is, a unit change in the number displayed by the dial wheels in such a case would correspond to a one millimeter movement of the indicator 26. Also, the gears 110 and 112 are preferably removable from the shaft 108 and 114 so as to permit their replacement by other gears having different ratios selected so that the dial wheels will read directly in other units of length. For example, it may be desirable to employ a gear ratio such that the dial wheels 124, 124 read 0.001 inch per count or 0.01 inch per count.

Figure 10:
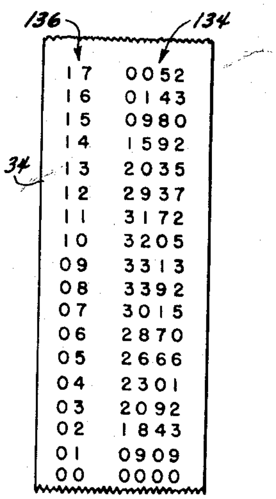
FIG. 10 is a plan view of a portion of a printed record of the type provided by the apparatus of FIG. 1.

The printing counter 122 also serves to provide a printed record of the readings taken by the reading head 16. That is, the printing counter contains a printing mechanism which is actuatable to print a record of the numbers displayed by the dial wheels at the window 32 each time the reading head indicator 26 is moved into registration with a point to be read on the curve. For this purpose the printing counter is adapted to receive the paper record strip 34 which is wound on a roll 132 supported by suitable means from the rear of the printing counter. The strip 34 extends through the latter device, as shown in FIG. 7, and upon actuation of the printing mechanism the two numbers displayed by the dial wheels 124, 124 and 126, 126 are printed thereon. After each set of two numbers is recorded on the strip 34 the printing mechanism operates to advance the sheet a slight amount so that successive numbers printed thereon will be arranged in a columnar or tabulated form with the timing counts supplied by the dial wheels 126, 126 being located directly adjacent and to the left of the corresponding amplitude numbers provided by the dial wheels 124, 124. A sample of a printed record provided by the printing counter 122 is shown in FIG. 10 wherein the column of numbers indicated at 134 are the amplitude numbers corresponding to the amplitude of the curve at the points which were read and the column of numbers indicated at 136 are the timing counts which indicate the order in which the readings were taken.

Figure 11:
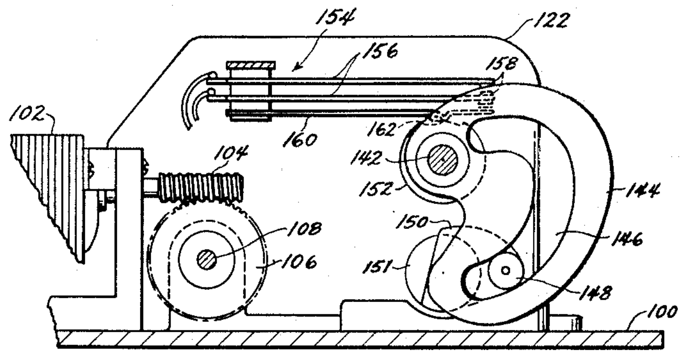
FIG. 11 is a vertical sectional view of the power and readout unit taken in the direction of the arrows 11—11 of FIG. 7 and showing the actuating cam of the printing counter at the beginning of the print cycle.

Operation of the printing counter 122 to cause printing of the numbers displayed by the dial wheels 124, 124 and 126, 126 is effected by a direct current print motor 138 mounted on the frame 100, as shown in FIG. 7. Drivingly connected with the motor 138 is an oscillatory drive mechanism 140 which is operable to convert unidirectional rotary movement of the motor armature into an oscillating rotary movement of an output shaft 142. Attached to the output shaft 142 is a cam 144 having a slot 146 for receiving a follower roll 148. The follower roll 148 is in turn attached to an actuating arm 150 fixedly secured to the operating shaft 151 of the print mechanism of the printing counter 122, the operating shaft 151 being oscillatable to cause printing and advancement of the paper strip through the printing counter. The cooperation and structure of these latter parts are shown best in FIGS. 11 and 12. In FIG. 11 the cam 144 is shown in the position assumed at the start and end of the print cycle, while in FIG. 12 the cam is shown at the mid-portion of the print cycle. The oscillating movement of the shaft 142 is such that during a print cycle the cam 144 will be moved from the position shown in FIG. 11 to the position shown in FIG. 12 and then back to the FIG. 11 position. During this movement of the cam 144 the slot 146 thereof cooperates with the follower roll 148 to cause a corresponding oscillation of the actuating arm 150 and operating shaft 151. This oscillation of the operating shaft 151 is in turn effective to cause printing of the displayed numbers and movement of the paper strip 34 relative to the mechanism in preparation for the next print cycle.

Figure 12:
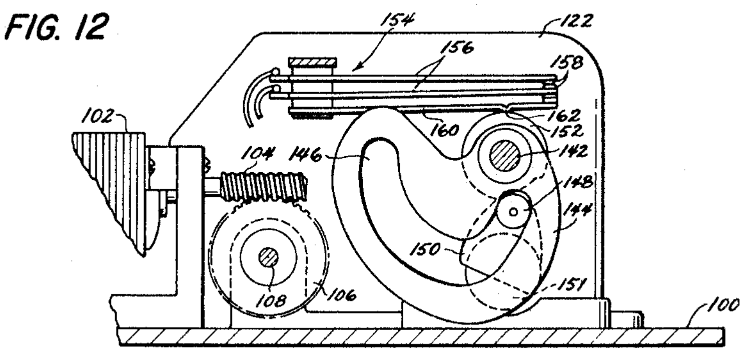
FIG. 12 is a view similar to FIG. 11, but shows the actuating cam of the printing counter at the midpoint of the print cycle.

As hereinafter described the operation of the print motor 138 is such that upon actuation of the print switch 30 on the reading head 16 the motor will be energized to provide one complete oscillation of the cam 144 and will then be de-energized to stop the movement of the cam. To provide for this type of control the shaft 142 has mounted thereon another cam 152 which cooperates with a leaf switch 154. As shown in FIGS. 11 and 12 the switch 154 comprises two leaves 156, 156, having normally open contacts 158, 158, and an actuating leaf 160 provided with a rib 162 which rides against the surface of the cam 152. As shown in FIG. 11, at the start and end of the print cycle the rib 162 engages a reduced diameter portion of the surface of the cam 152 at which the contacts 158, 158 are opened. After the shaft 142 is rotated slightly beyond the starting position of the print cycle the rib 162 will engage a larger diameter portion of the surface of the cam 152 so as to hold the contacts 158, 158 in a closed position, as shown in FIG. 12. The operation of the switch 154 in controlling the energization of the print motor will be described in more detail hereinafter in connection with the electrical circuit for the apparatus.

In addition to the parts hereinabove described, the print and readout unit 18 also includes a transformer 164 mounted on the base 100, as shown in FIG. 7, and two relays 166 and 168 mounted on top of the transformer. At the front right-hand corner of the frame 100 is a switch 170 for connecting and disconnecting the electrical circuit to and from the power supply. Adjacent the switch 170 is a panel 172 on which is mounted other elements of the electrical circuit, such as rectifiers and the like. The function and interconnection of these elements will be described below. As shown in FIG. 1, the power and readout unit is preferably provided with a removable cover 176 which encloses most of the parts shown in FIG.

7 except for the paper roll 132, the zeroing lever 128 and the zeroing knob 129.

*Electrical circuit*

Figure 13:
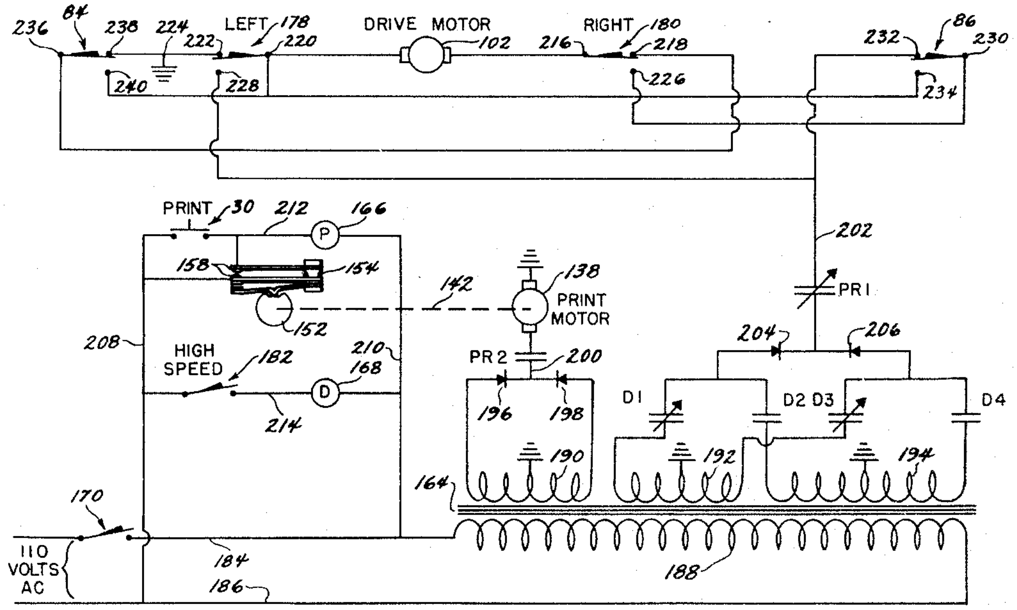
FIG. 13 is a schematic diagram of the electrical circuit employed in the data reading apparatus of FIG. 1.

The electrical circuit for the data reading apparatus of the present invention is shown by the schematic diagram of FIG. 13. In this diagram the various contacts are shown in the condition attained when the speed control switch 28 is in the "off" position, the print switch 30 is unactuated, and the indicator 26 is out of contact with both of the limit switches 84 and 86. The speed control switch 28, as shown in FIGS. 3 and 4, is actually a single selector switch having a plurality of terminals and a number of different positions at which different interconnections are made between the terminals, but for purposes of clarity this switch is shown in FIG. 13 to comprise three separate switches 178, 180 and 182 which are controlled by the knob of the switch 28 in the manner set forth below. In other words, although the switches 178, 180 and 182 are shown separately in FIG. 13 they should be considered to comprise the single selector switch 28 and to be controlled by the operation of the knob of the latter switch.

Power is supplied to the electric circuit shown in FIG. 13 through the supply lines 184 and 186 which are preferably connected to a 110-volt alternating current source. The line 184 contains the switch 170 which is operable to connect or disconnect the circuit to or from the source. Connected between the lines 184 and 186 is the primary coil 188 of the transformer 164, said transformer also having two low voltage secondary coils 190 and 192, and a high voltage secondary coil 194, each of which coils is center tapped and grounded, as shown. The low voltage coil 190 is connected with two rectifiers 196 and 198 side of the print motor 138, and the other side of the motor is grounded. The low voltage coil 192 and the high voltage coil 194 are adapted to selectively supply either high or low voltage power to the line 202 which acts as the supply line for the drive motor 102. The two sides of the low voltage coil 192 are connected with the two rectifiers 204 and 206 through the normally closed contacts D1 and D3, while the two sides of the high voltage coil 194 are connected to the same rectifiers through the normally open contacts D2 and D4. As hereinafter described the contacts D1, D2, D3 and D4 are operated by the relay coil D in such a manner that the contacts D2 and D4 are opened or closed alternately with the contacts D1 and D3 so that when one set of contacts is closed the other set will be open. Thus, one or the other of the two coils 192 and 194 will be connected with the rectifiers 204 and 206 depending on whether the relay coil D is energized or de-energized. The rectifiers 204 and 206 serve to supply a full wave rectified voltage to the line 202, the value of which voltage depends on which one of the two coils 192 and 194 is connected with the rectifiers.

Also connected with the supply lines 184 and 186, respectively, are two other lines 208 and 210. Between these latter lines is a line 212 containing the print switch or push button 30 and the relay coil P of the relay 166. The relay coil P controls the operation of the normally closed contacts PR1 located in the line 202 and the normally open contacts PR2 located in the line 200. When the print switch 30 is depressed, the relay coil P is energized. This causes the contacts PR2 to be closed to supply electrical power to the print motor 138, which in turn causes movement of the output shaft 142 to operate the printing mechanism of the printing counter 122. At the same time, the energization of the relay coil P causes the contacts PR1 to be opened to interrupt the electrical supply to the drive motor 102, thereby preventing operation of the drive motor while the printing counter is performing a printing operation. The relay coil P is also connected with the line 208 through the leaf switch 154 which is in parallel with the print switch 30. After the print motor is started on a print cycle the cam 152 on the shaft 142 moves to close the contacts 158, 158 of the leaf switch and holds the same closed until the print cycle is completed. Thus, the print switch 30 need only be depressed momentarily to start the print cycle and thereafter the leaf switch 154 will function to continue the energization of the relay P, and thus the energization of the print motor 138, until the cycle is completed.

Also connected between the lines 208 and 210 is a line 214 which contains the switch 182 and the relay coil D of the relay 168. Closing of the switch 182 energizes the relay coil D to open the normally closed contacts D1 and D3 and to close the normally open contacts D2 and D4, thereby connecting the high voltage coil 194 with the supply line 202 in place of the low voltage coil 192. Operation of the switch 182 is controlled by the knob of the selector switch 28 in such a manner that when the knob is set at the "stop" position or at either the right and left "low" positions the switch will be opened, while when the knob is set at either the right or left "high" positions the switch will be closed. Thus, in both of the two "low" positions of the switch 28 the drive motor is supplied with low voltage electrical power so as to drive the indicator 26 to the right or left at a relatively low speed, while in both of the two "high" positions of the switch the drive motor is supplied with high voltage electrical power so as to drive the indicator to the right or left at a relatively high speed.

Furthermore, the operation of the drive motor 102 is such that whenever the selector switch 28 is in the "stop" position, or when either one of the limit switches 84 or 86 is operated, both sides of the motor will be grounded or electrically connected together so as to dynamically brake the movement of its armature and cause a sudden stopping of the movement of the indicator 26. As shown in FIG. 13, when the knob of the selector switch is in the "off" position the switch 180 provides a contact between the terminals 216 and 218 and the switch 178 makes a contact between the terminals 220 and 222. When the switches are in this condition it will be seen that both sides of the motor are connected together and to the ground terminal at 224. When the knob is moved to either the high or low right position, the switch 180 is moved to break the contact between the terminals 216 and 218 and to make a contact between the terminals 216 and 226. In this position it will be seen that the left-hand side of the drive motor 102 is connected to the ground at 224 through the switch 178 while the right-hand side of the motor is connected to the supply line 202 through the switch 180 and the limit switch 86, and accordingly the motor will be energized to drive the indicator 26 to the right with respect to the reading head 16. Likewise, when the knob of the selector switch is moved to either the high or low left position the switch 178 will be operated to break the contact between the terminals 220 and 222 and to make a contact between the terminals 220 and 228. In this position it will be seen that the right-hand side of the drive motor is connected to the ground at 224 through the switch 180 and the limit switch 84, while the left-hand side of the drive motor is connected to the switch 202 through the switch 178. The drive motor is thus energized to drive the indicator to the left with respect to the reading head 16.

If the selector switch 28 is operated to cause movement of the indicator 26 to the right or the left and is maintained in such position until the indicator moves close to the limit of its travel the latter will engage and operate one or the other of the limit switches 84 and 86. This will cause the previously energized side of the motor to be disconnected from the supply line 202 and to be connected with the other side of the motor to brake the same. For example, assume that the selector switch is moved to one of the right positions at which the switch 180 is moved to make contact between the terminals 216 and 226 and at which the drive motor will be energized to drive the indicator 26 to the right toward the limit switch 86. As the indicator approaches the right-hand extent of its travel it will engage the limit switch 86 and break the contact between the terminals 230 and 232 and make a contact between the terminals 230 and 234. This in turn breaks the connection between the right side of the motor and the supply line 202 and makes a connection between both sides of the motor through the switch 180 and the switch 86. Likewise, if the selector switch knob is moved to one of the two left positions at which the switch 178 makes contact between the terminals 220 and 228, continued movement of the indicator to the left will eventually cause it to strike and operate the limit switch 84 causing the latter to break the contact between the terminals 236 and 238 and to make a connection between the terminals 236 and 240. This in turn disconnects the right-hand side of the drive motor from the ground at 224 and connects the same to the left-hand side of the motor through the switch 84 and the switch 178.

*Use of the reading apparatus*

Having now described the structure of the reading apparatus shown in FIG. 1 its use in reading the amplitude of a curve or trace will now be considered with reference to FIGS. 1, 2 and 6.

As a first step preparatory to making any curve readings, the hairline 72 of the indicator 26 is moved into registration with one of the vertical hairlines 50, 50 on the bottom plate 46 which serves as a reference line. Generally, the hairline 50 at the left side of the reading head is chosen and the hairline 72 is moved into registration therewith by operation of the speed control switch 28. After the two hairlines 50 and 72 are brought into registration the printing counter 122 is zeroed by operating the lever 128 and turning the knob 129 until all of the dial wheels 124, 124 and 126, 126 read zero. The reading head 16 is then adjusted relative to the chart sheet 22 to bring it into such a position that the path of movement of the indicator 26 will be in a direction transverse to the chart sheet. This is done by registering the refeernce vertical hairline 50 with a selected zero reference line on the chart sheet 22, such zero reference line being one of the longitudinally extending dividing lines of the chart sheet. For example, in FIG. 2 the longitudinal line indicated at A may be chosen as the zero reference line and the left-hand vertical hairline 50 of the reading head 16 is registered with this line during the first and subsequent readings.

The indicator 26 is now advanced toward the point of interest on the curve, by operation of the speed control switch 28, until the hairline 72 registers with such point. The print button 30 is then depressed, which will cause the numbers displayed by the printing counter at the window 32 to be printed on the paper strip 34. These numbers will consist of a timing count and an amplitude number indicating the amplitude of the curve with respect to the reference line A. For the second reading, the reading head 16 is moved longitudinally of the chart sheet 22, if necessary, making sure that the reference hairline 50 at the lefthand side thereof is registered with the reference line A on the chart sheet 22, and the hairline 72 is then driven to the second point in question by the operation of the speed control switch 28. The print button is then again pressed to cause the printing of the new set of numbers displayed by the printing counter. This process is then continued in regard to the other points of interest until all of the latter have been read and recorded. As mentioned previously, where it is desired to take a number of readings at equal increments along the longitudinal axis of the curve the variable scale device comprising the slide 88 and the extensible spring 90 may be employed to divide any given length of curve into the desired equal increments. After all of the readings are taken the end portion of the paper strip 34 may be pulled from the power and readout unit 18 and cut from the remainder of the strip on the roll 132 for use in making further calculations or the like.

*Use of the reading head with an overlay indicator*

Figure 14:
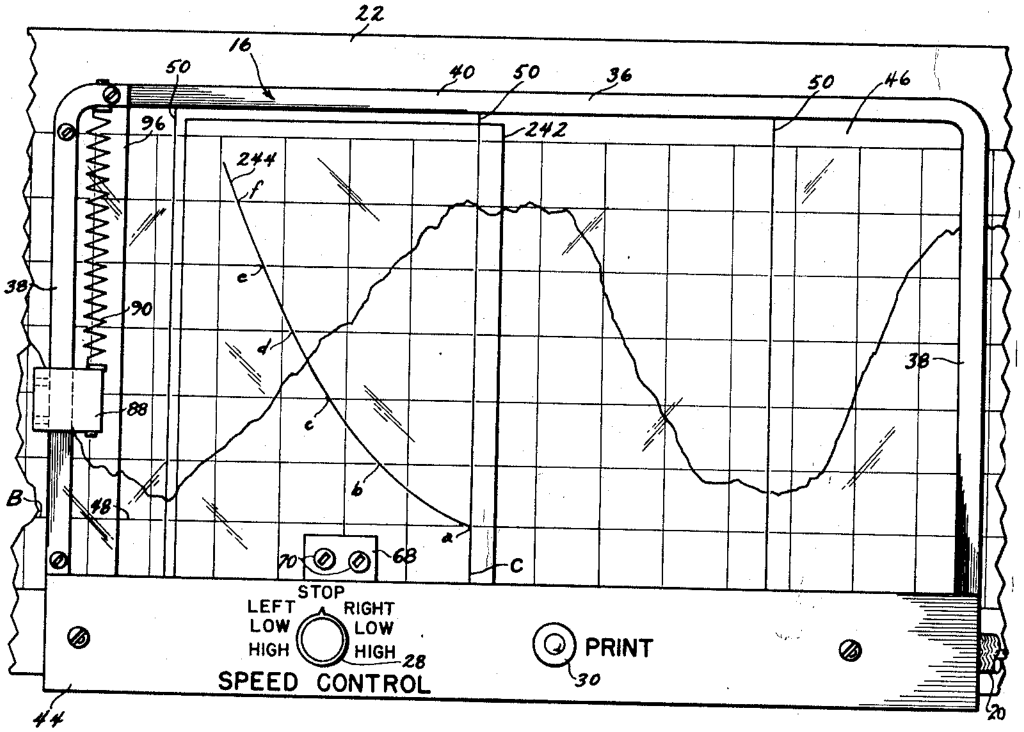
FIG. 14 is a view generally similar to FIG. 2 but showing the reading head provided with an overlay indicator rather than a straight hairline indicator.

Instead of the indicator 26 having a straight hairline 72, the reading head 16 may also be used with an indicator in the form of an overlay adapted to have a calibrated line drawn thereon for producing linearized readings from curves having arbitrary or nonlinear scale factors. Such an overlay is shown in FIG. 14 to comprise a flat sheet 242 of transparent or translucent material adapted to be attached to the bracket 68 by the screws 70 in place of the indicator 26. On the overlay is a calibration or linearization curve 244 which is constructed and used as indicated below.

After an overlay 242 is attached to the reading head, it is driven toward the left side thereof, by operation of the switch 28, until the center vertical reference line 50 on the bottom plate 46 is about one quarter of an inch to the left of the right edge of the overlay. The reading head is then adjusted relative to the chart sheet 22 to align one of the horizontal hairlines 48, 48 on the bottom plate with a selected longitudinal base line on the chart sheet, and to align the center hairline 50 with one of the transverse lines on the chart sheet. As an example of a proper alignment of the reading head, FIG. 14 shows the bottom horizontal reference line 48 in registration with the longitudinal chart line B, chosen as the base line, and the center vertical reference line 50 in register with the transverse chart line C. Now the printing counter 122 is zeroed by operation of the lever 128 and a mark is made on the overlay 242 at the point where the vertical hairline 50 crosses the zero ordinate on the chart. Assuming that the base line B represents the zero ordinate the mark would then be made at the point marked *a*.

Now suppose that the scale factor along the transverse axis of the chart is such that the function represented by the curve progresses along the transverse axis in such a manner that at the longitudinal dividing lines shown in FIG. 14, and starting with the base line B, the value of the function is 0, 60, 90, 115, 135 and 150, respectively. The overlay is then driven to the right until the dial wheels 124, 124 of the printing counter read 600. The overlay is then marked, as at *b*, where the vertical hairline 50 intercepts the "60" line on the chart. The overlay is then driven further to the right until the dial wheels 124, 124 read 900, and is marked, as at *c*, where the vertical hairline 50 intercepts the "90" line on the chart. This process is then continued by driving the overlay to cause the dial wheels to successively read 1150, 1350 and 1500, and by successively marking the overlay at the points *d*, *e* and *f* where the vertical hairline intercepts the "115," "135" and "150" chart lines, respectively. The line 244 is then constructed on the overlay by smoothly connecting the points *a* to *f*.

After the curve 244 is constructed any point on the chart may be easily read using this curve as the hairline, and the results printed by the printing counter will be directly related to the value of the function represented by the curve at the points read. To use the overlay 242 in reading a point on the curve the bottom horizontal hairline 48 is maintained in alignment with the base line B on the chart and the reading head is shifted longitudinally of the chart until the center or reference vertical hairline 50 intercepts the point in question. The overlay is then driven until the curve 244 thereon intercepts the same point, which will cause the dial wheels 124, 124 to display a number directly related to the value represented by the amplitude of the curve at the point in question. The print button 30 is then pressed to cause the number to be printed on the record strip 34. Other points may then be read and recorded by repeating this process.

*Use of the reading head with two hairline indicators and a calibration sheet*

To produce linearized readings from curves having arbitrary or nonlinear scale factors, the basic reading head construction as described hereinbefore may also be used with two straight hairline indicators and a calibration sheet fixed to the transparent bottom plate. Such an arrangement is shown in FIGS. 15 and 16.

Referring to the latter figures, the illustrated reading head 16 is shown to be basically similar to that illustrated in FIG. 2, the main difference being the addition of an extra hairline indicator 250 mounted for sliding adjustment transversely of the reading head by a slide 252 carried by the right-hand side portion 38 of the frame. The indicator 250 extends substantially the full length of the transparent bottom plate or member 46 and passes underneath the indicator 26 so as to be positioned between the bottom plate and the indicator 26. The indicator 250 is preferably relatively thin so that despite its presence the indicator 26 will still be relatively closely spaced to the bottom plate 46 and chart sheet 22 to minimize parallax. A straight hairline 254 is provided on the indicator 250 and is disposed parallel to the horizontal hairlines 48, 48 on the bottom plate and perpendicular to the hairline 72 on the indicator 26. By manual adjustment of the slide 252, the hairline 254 may be moved to any transverse position relative to the bottom plate, the slide 252 being adapted to hold the position to which it is moved. Although the indicator is shown to include the separate hairline 254, such a hairline is not completely necessary since one or the other of the straight edges of the indicator may be used in place of or as the hairline if desired.

Figure 15:
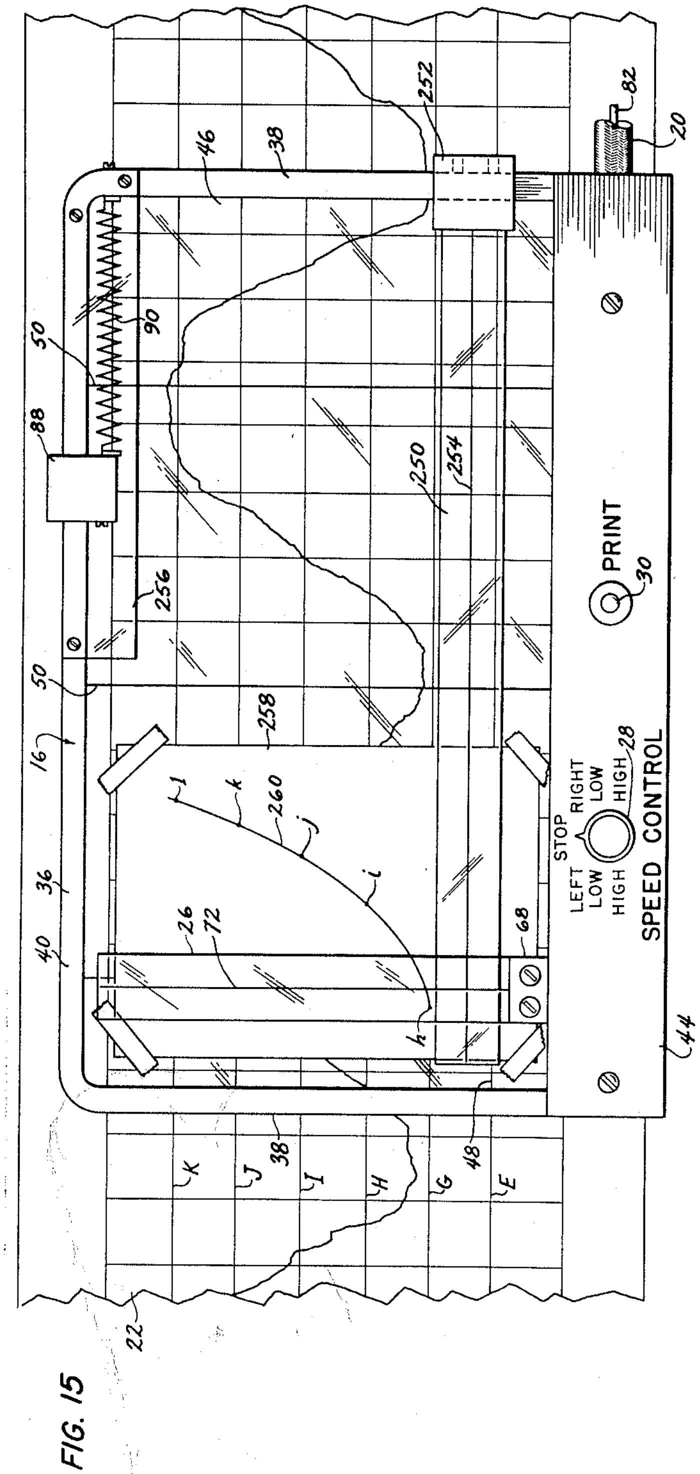
FIG. 15 is a view generally similar to FIG. 2, but showing the reading head provided with two straight hairline indicators and a calibration sheet for producing linearized results.
Figure 16:
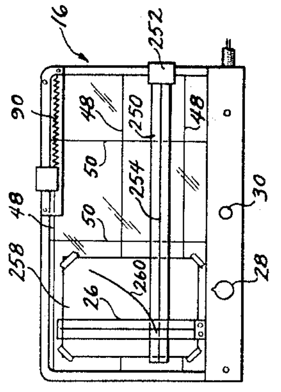
FIG. 16 is a reduced plan view of the reading head shown in FIG. 15 with the chart sheet being removed from behind the same to show more clearly the hairlines on the bottom plate.

Also, as shown in FIGS. 15 and 16 the extensible spring 90, if the reading head is equipped with two indicators, is preferably located adjacent and parallel to the rear frame portion 40 with the slide 88 being carried by said latter frame portion and slidably adjustable relative thereto to vary the length of the spring. In this position the spring is useful to divide a longitudinal extent of the chart sheet in equal divisions, as hereinabove described, when the reading head is positioned on the chart sheet in the manner shown in FIG. 15. With the spring positioned as shown in FIG. 15, the reading head also preferably includes a protective transparent shield or cover 256 for the spring, which cover is generally similar to the cover 96 shown in FIG. 2.

The calibration sheet is indicated at 258 in FIGS. 15 and 16, and preferably consists of a sheet of paper or other suitable material on which a calibration curve, such as indicated at 260, may be constructed or drawn as hereinafter described. The sheet 258 is securely fixed to the top surface of the bottom plate by suitable means, such as pressure sensitive tape, and is preferably located at the left-hand side of the bottom plate. This leaves a clear or unobstructed area of the bottom plate to the right of the calibration sheet and through which clear area a portion of the chart sheet 22 is visible for the purpose of taking readings. The location of the calibration sheet is, however, not important, and it may be desirable at times to position the sheet further to the right than shown in FIG. 15 so as to have a clear area of the bottom plate to the left thereof for reading the chart sheet. The important consideration is that part of the longitudinal extent of the bottom plate be unobstructed and transparent, so that the chart sheet 22 may be viewed clearly therethrough, and that another part of the longitudinal extent of the bottom plate be adapted to have a calibration curve drawn thereon. Furthermore, the part of the bottom plate on which the calibration curve is drawn need not necessarily be adapted to this purpose by the provision of the separate calibration sheet 258. For example, it may be desirable to provide the bottom plate in such a form that part of it is transparent, while another part is provided with an upper surface onto which a calibration curve may be directly drawn and preferably from which the same curve may be readily removed to permit the construction of other curves to suit other chart sheets. Therefore, although a separate calibration sheet is shown and described, and is preferred, it is to be understood that the sheet could be omitted and the surface of the bottom plate directly under the omitted sheet provided with a proper quality surface for directly receiving the calibration curve.

To construct the calibration curve 260 the reading head 16 is first manually adjusted relative to the chart sheet 22 to align one of the horizontal hirlines 48, 48 on the bottom plate with a selected longitudinal base line on the chart sheet. As an example of a proper adjustment, FIG. 15 shows the bottom horizontal hairline 48 in registration with the longitudinal chart line E. The bottom hairline 48 is thus the reference hairline and the chart line E the base line.

By operation of the speed control switch 28, the indicator 26 is now moved to a location at which the hairline 72 overlies the calibration sheet and is spaced some distance to the right of the left-hand edge thereof. Thereafter the printing counter is zeroed by operation of the lever 128. The indicator 250 is then adjusted transversely of the reading head by manipulation of the slide 252 until its hairline 254 coincides with the zero ordinate on the chart sheet 22, and a mark is made on the calibration sheet at the point where the hairline 72 crosses the hairline 254. Assuming that the longitudinal chart line G represents the zero ordinate the mark would then be made at the point marked *h*.

Assume now that the scale factor along the transverse axis of the chart is such that the function represented by the chart sheet curve progresses along the transverse axis in such a manner that at the longitudinal dividing lines G, H, I, J and K, the value of the function is 0, 60, 90, 115 and 135, respectively. The indicator 250 is then moved to bring the hairline 254 into register with the line H and the indicator 26 driven to the right until the dial wheels 124, 124 of the printing counter read 600. The calibration sheet is then marked as at *i* where the two hairlines 72 and 254 intersect. The hairline 254 is then moved into register with the line I, the indicator 26 moved to the right until the dial wheels read 900, and the calibration sheet marked as at *j* where the two hairlines cross. This process is then continued by successively moving the hairline 254 into register with the lines J and K, successively moving the indicator 26 to cause the dial wheels to read 1150 and 1350, and successively marking the calibration sheet at the points *k* and *l*. The calibration curve 260 is then constructed by smoothly connecting the points *h* to *l*.

After the curve 260 is constructed, any point of the curve on the chart sheet 22 may be read by using this curve in conjunction with the two indicators, and the results printed by the printing counter will be directly related to the values of the function represented by the curve at the points read. To read a point on the curve of the chart sheet 22, the bottom horizontal hairline 48 is maintained in alignment with the base line E and the reading head is positioned so that the clear area of the bottom plate is above the point in question. The slide 252 is then adjusted to bring the hairline 254 into registration with the point in question. Then the indicator 26 is driven, by operation of the switch 28, until its hairline 72 coincides with the point of intersection between the calibration curve 260 and the hairline 254. The print button 30 is then pressed to cause the number displayed by the dial wheels 124, 124 to be printed on the record strip 34, and this number will be directly related to the value represented by the amplitude of the curve at the point in question. Other points of the curve appearing through the clear portion of the bottom plate may then be read and recorded by repeating this process. Furthermore, the reading head need not always be shifted longitudinally of the chart sheet each time a point is read. Instead, all of the points of the curve appearing through the clear portion of the bottom plate may be read without shifting the reading head.

The invention claimed is:

1. A data reader for use with a chart sheet held in a fixed position which chart sheet has data in the form of a curve recorded thereon and includes at least one longitudinal reference line thereon, said data reader comprising in combination, a first frame adapted to be located above such a chart sheet, a slide guided for rectilinear movement relative to said frame, an indicator in fixed relationship with said frame and adapted upon adjustment of said frame to register with said reference line and to thereby position the path of said slide in perpendicular relationship with said reference line, a second indicator connected with said slide for movement therewith, a lead screw supported for rotation relative to said frame about an axis parallel to the path of said slide and which screw threadably engages said slide and serves upon rotation to move said slide transversely of the chart to bring said second indicator into registration with a selected point on said curve while said fixed indicator remains in registration with said reference line, a variable scale device connected with said frame in parallel relationship with said second indicator and which device is operable to divide a selected longitudinal extent of said chart sheet into a predetermined number of equal divisions at each of which said curve is to be read, a second frame separate from said first frame, a drive motor mounted on said second frame and having a rotatable output member, drive means connected between said output member and said screw for transmitting rotation of said output member to said screw to cause transverse movement of said indicator, and a mechanism mounted on said second frame and connected with said rotatable output member which mechanism provides a digital readout having a numerical value proportional to the total angular displacement of said output member from a given reference position and which numerical value is thus related to the displacement of said movable indicator from a given position along its path of transverse movement.

2. A data reader for use with a chart sheet held in a fixed position which chart sheet has data in the form of a curve recorded thereon and includes at least one longitudinal reference line thereon, said data reader comprising in combination, a first frame adapted to be located above such a chart sheet, a flat bottom member in fixed relationship with said frame and made from a light transmitting material through which said chart sheet may be viewed, said flat bottom member having a fixed hairline thereon adapted upon adjustment of said frame to register with said reference line, a slide guided for rectilinear movement relative to said frame and above said bottom member in a path perpendicular to said reference line when said hairline is registered with said reference line, an indicator connected with said slide for movement therewith and having a hairline thereon parallel to the hairline of said bottom member, a lead screw supported for rotation relative to said frame about an axis parallel to the path of said slide and which screw threadably engages said slide and serves upon rotation to move said slide to bring the hairline of said second indicator into registration with a selected point on said curve while the hairline of said bottom member remains in registration with said reference line, a second frame separate from said first frame and movable relative thereto, a drive motor mounted on said second frame and having a rotatable output member, flexible drive means connected between said output member and said screw for transmitting rotation of said output member to said screw to cause movement of said indicator and for permitting said first frame to be moved relative to said second frame without impairing the driving of said lead screw by said drive motor, and a mechanism mounted on said second frame and connected with said rotatable output member which mechanism provides a digital readout having a numerical value proportional to the total angular displacement of said output member from a given reference position and which numerical value is thus related to the displacement of said movable indicator from a given position along its path of transverse movement.

3. A data reader for use with a chart sheet held in a fixed position and having data in the form of a curve recorded thereon, said data reader comprising a reading head adapted to be placed in a fixed position over said chart sheet and having an indicator movable into registration with selected points on said curve, a frame separate from said reading head movable relative thereto, a drive motor connected with said frame and having a rotatable output member, a flexible drive shaft drivingly connected between said output member and said reading head, said reading head including means for transforming rotary movement of said flexible drive shaft into proportionate movement of said indicator, a printing counter mounted on said frame and drivingly connected with said output member so as to measure the displacement of said indicator from a given zero position, said printing counter serving to display a number related to the displacement of said indicator from said given zero position and being actuatable to print the displayed number on a record sheet with successive printed numbers being arranged in tabulated form, and manually operable means on said first frame for permitting an operator to remotely control the operation of said printing counter and said drive motor from said first frame.

4. A data reader for use with a chart sheet held in a fixed position and having data in the form of a curve recorded thereon, said data reader comprising a reading head adapted to be placed in a fixed position over said chart sheet and having an indicator movable into registration with selected points on said curve, a frame separate from said reading head movable relative thereo, a drive motor connected with said frame and having a rotatable output member, a flexible drive shaft drivingly connected between said output member and said reading head, said reading head including means for transforming rotary movement of said flexible drive shaft into proportionate movement of said indicator, a printing counter mounted on said frame and drivingly connected with said output member so as to measure the displacement of said indicator from a given zero position, said printing counter serving to display a number related to the displacement of said indicator from said given zero position and having an operating shaft which is oscillatable to cause the same to print the displayed number on a record sheet, a print motor on said frame, a drive mechanism connected between said print motor and said operating shaft for converting unidirectional rotary motion of said print motor into oscillating movement of said operating shaft, and an electrical circuit for controlling the operation of said print motor, said electrical circuit including a switch on said reading head operable to initiate the energization of said print motor and means for maintaining the energization of said print motor independently of said switch until said operating shaft has been moved through one complete oscillation to cause said printing counter to print the displayed number and for then de-energizing said print motor.

5. A data reader for use with a chart sheet held in a fixed position and having data in the form of a curved recorded thereon, said data reader comprising a reading head adapted to be placed in a fixed position over said chart sheet and having an indicator movable into registration with selected points on said curve, a frame separate from said reading head, a drive motor connected with said frame and having a rotatable output member, a flexible drive shaft drivingly connected between said output member and said reading head, said reading head including means for transforming rotary movement of said flexible drive shaft into proportionate movement of said indicator and said flexible drive shaft enabling movement of said reading head relative to said frame, an electrical circuit for said drive motor which circuit includes a first switch which is selectively operable to energize said drive motor to cause movement of said indicator in one direction or the other and at either a high or a low rate of speed, a printing counter mounted on said frame and drivingly connected with said output member so as to measure the displacement of said indicator from a given zero position, said printing counter serving to display a number related to the displacement of said indicator from said given zero position and having an operating shaft which is oscillatable to cause the same to print the displayed number on a record sheet, a print motor on said frame, a drive mechanism connected between said print motor and said operating shaft for converting unidirectional rotary motion of said print motor into oscillating movement of said operating shaft, and an electrical circuit for controlling the operation of said print motor which circuit includes a second switch operable to initiate the energization of said print motor and means for maintaining the energization of said print motor independently of said second switch until said operating shaft has been moved through one complete oscillation to cause said printing counter to print the displayed number and for then de-energizing said print motor, said first and second switches being mounted on said reading head so that the movement of said indicator and the printing operation of said printing counter may be controlled from said reading head.

6. A data reader for use with a chart sheet held in a fixed position and having data in the form of a curve recorded thereon which curve has a nonlinear scale factor in the transverse direction of said chart sheet and includes at least one longitudinal reference line thereon, said data reader comprising in combination, a first frame adapted to be located above such a chart sheet, a flat bottom member in fixed relationship with said first frame and made from a light transmitting material through which said chart may be viewed, said bottom member having at least one horizontal hairline and one vertical hairline thereon, said frame being adjustable relative to said chart sheet to bring said horizontal hairline into registration with said longitudinal reference line, a slide guided for rectilinear movement relative to said frame along a path parallel to said horizontal hairline, an indicator connected with said slide which indicator comprises a flat sheet of light transmitting material through which said chart sheet may be viewed and on which a curve for reading said chart curve may be constructed, a lead screw threadably engaged with said slide and rotatable in one direction or the other for moving the slide relative to said frame and longitudinally of said chart sheet while said frame remains positioned with said horizontal hairline in registration with said reference line, a second frame separate from that of said reading head, a drive motor mounted on said second frame and having a rotatable output member, drive means connected between said output member of said drive motor and said lead screw for transmitting rotation of said output member to said lead screw to cause movement of said indicator, and a printing counter mounted on said second frame and drivingly connected with said output member so as to measure the displacement of said indicator from a given zero position.

7. A data reader for use with a chart sheet held in a fixed position and having data in the form of a curve recorded thereon which curve has a nonlinear scale factor in the transverse direction of said chart sheet and includes at least one longitudinal reference line thereon, said data reader comprising in combination, a first frame adapted to be located above such a chart sheet, a flat bottom member in fixed relationship with said first frame and having a first area through which said chart sheet may be viewed and another area adapted to have a calibration curve drawn thereon, said bottom member having at least one horizontal hairline thereon, said frame being adjustable relative to said chart sheet to bring said horizontal hairline into registration with said longitudinal reference line, a first slide guided for longitudinal movement relative to said frame along a path parallel to said horizontal hairline, an indicator connected with said first slide and extending transversely of said frame and bottom member, a lead screw threadably engaged with said first slide and rotatable in one direction or the other for moving the slide longitudinally of said frame and bottom member, a second slide guided for transverse movement relative to said frame along a path perpendicular to said longitudinal hairline, an indicator connected with said second slide and extending longitudinally of said frame and bottom member, a second frame separate from that of said reading head, a drive motor mounted on said second frame and having a rotatable output member, drive means connected between said output member of said drive motor and said lead screw to cause movement of said first slide and the indicator connected therewith, and a printing counter mounted on said second frame and drivingly connected with said output member so as to measure the displacement of said latter indicator from a given zero position.

8. A reading head for use in a data reader for converting data in the form of a generally longitudinal extending curve recorded on a chart sheet having a longitudinal reference line to a different form and which reading head comprises, a frame adapted to be located above such a chart sheet as the chart sheet is held in a fixed position, a flat bottom member in fixed relationship with said frame and through which a portion of said chart sheet may be viewed, said bottom member having first and second mutually perpendicular fixed hairlines thereon, the first of which hairlines is adapted to be brought into registration with a longitudinal reference line on a chart sheet such as aforementioned by adjustment of said frame relative to said chart sheet so as to position said frame and bottom member in a reading relationship relative to said chart sheet, an overlay indicator movable rectilinearly relative to said frame and bottom member in a direction parallel to said first fixed hairline which overlay indicator comprises a flat sheet of material overlying said bottom member and through which a chart sheet such as aforementioned may be viewed, said overlay indicator being adapted to have a curve constructed thereon, and means for moving said overlay indicator to bring a curve constructed thereon into simultaneous registration with said first fixed hairline and selected points of a curve recorded on a chart sheet such as aforementioned, said latter means including a rotatable member the angular displacement of which is proportionately related to the rectilinear displacement of said indicator.

9. A reading head for use in a data reader for converting data in the form of a curve recorded on a chart sheet to a different form and which reading head comprises, a frame adapted to be located above a chart sheet as the latter is held in a fixed position, a flat bottom member in fixed relationship with said frame and having a first longitudinal extent through which a portion of said chart sheet may be viewed and a second longitudinal extent adapted to have a calibration curve constructed thereon, said bottom member having at least one fixed hairline thereon adapted to be brought into registration with a reference line on the chart sheet by adjustment of said frame to thereby position said frame and bottom member in a reading relationship relative to said chart sheet, a first indicator movable rectilinearly in a transverse direction relative to said frame and bottom member and having a hairline which extends longitudinally across both said first and second extents of said bottom member so as to be simultaneously registrable with a point of a curve on said chart sheet and with a point on a calibration curve constructed on said second longitudinal extent of said bottom member, and a second indicator movable rectilinearly in a longitudinal direction relative to said frame and bottom member and having a transverse hairline adapted to be brought into registration with the point of intersection between said first mentioned hairline and said calibration curve.

10. The combination as defined in claim 9 further characterized by means for moving said first indicator which means includes a rotatable member the angular displacement of which is proportionately related to the rectilinear displacement of said first indicator.

11. A reading head for use in a data reader for converting data in the form of a curve recorded on a chart sheet to a different form and which reading head comprises, a frame adapted to be located above a chart sheet as the latter is held in a fixed position, a flat bottom member in fixed relationship with said frame, a calibration sheet fixed to the upper surface of said bottom member and adapted to have a calibration curve constructed thereon, said calibration sheet covering part of the longitudinal extent of said bottom member and leaving another part of the longitudinal extent thereof clear so that a portion of the chart may be viewed therethrough, said bottom member having at least one fixed hairline thereon adapted to be brought into registration with a reference line on the chart sheet by adjustment of said frame to thereby position said frame and bottom member in a reading relationship relative to said chart sheet, a first indicator movable rectilinearly in a transverse direction relative to said frame and bottom member and having a hairline which extends longitudinally across said bottom member so as to be simultaneously registrable with a point of a curve on said chart sheet and with a point on a calibration curve constructed on said second longitudinal extent of said bottom member, and a second indicator movable rectilinearly in a longitudinal direction relative to said frame and bottom member and having a transverse hairline adapted to be brought into registration with the point of intersection between said first mentioned hairline and said calibration curve.

12. A data reader for use in connection with data represented in the form of a curve appearing on a chart sheet or the like, said data reader comprising a first frame, a slide guided for rectilinear movement relative to said frame and including an indicator having means adapted to be brought into registration with a selected point on a curve such as aforesaid, a rotatable element carried by said frame, means for moving said slide rectilinearly relative to said frame in response to rotation of said rotatable element, a second frame separate from and movable relative to said first frame, a drive motor carried by said second frame and having a rotatable output shaft, drive means including a flexible drive shaft extending between said first and second frames for drivingly connecting said output shaft of said motor to said rotatable element of said first frame, and a readout mechanism carried by said second frame and drivingly connected with said output shaft of said motor for providing a digital readout having a numerical value proportional to the total angular displacement of said output shaft from a given reference position.

13. A data reader as defined in claim 12 further characterized by means for controlling the operation of said motor which means includes a manually operable switch located on said first frame.

14. A data reader as defined in claim 12 further characterized by means for selectively causing said motor to stop or to rotate said output shaft in one or the other of its two directions of rotation, said latter means including a manually operable electrical switch means located on said first frame and flexible electrical conductors extending between said first and second frames.

15. A data reader as defined in claim 14 further characterized by said flexible electrical conductors being joined to said flexible drive shaft to form a single flexible unit extending between said two frames.

16. A data reader as defined in claim 12 further characterized by said readout mechanism having connected therewith and located on said second frame a recording means for making a permanent record of the readout information presented by said readout mechanism at any given instant, and means for controlling the operation of said recording means which controlling means includes a manually operable switch located on said first frame.

17. A data reader as defined in claim 12 further characterized by said readout mechanism having connected therewith and located on said second frame a recording means for making a permanent record of the readout information presented by said readout mechanism, and electrical circuit means permitting manual control of both said drive motor and said recording means from said second frame, said circuit means including at least one manually operable switch on said first frame and flexible electrical conductors extending between said two frames.

18. A data reader as defined in claim 12 further characterized by said drive means for drivingly connecting said output shaft of said motor to said rotatable element of said first frame further including a pair of intermeshing gears removably mounted with respect to the other parts of said drive means so as to be replaceable by other pairs of gears to vary the drive ratio between said output which function to supply a full wave rectified voltage to the line 200. The line 200 is in turn connected to one shaft of said motor and said rotatable element of said first frame.

19. A data reader as defined in claim 12 further characterized by said first frame having fixed thereto a flat transparent bottom member adapted to be placed over a curve such as aforesaid and through which such a curve may be viewed, said transparent bottom member being arranged adjacent to and parallel with the plane of movement of said indicator.

20. A data reader as defined in claim 19 further characterized by said transparent bottom member having a reference line thereon perpendicular to the path of movement of said indicator.

21. A data reader as defined in claim 19 further characterized by said transparent bottom member having a reference line thereon parallel to the path of movement of said indicator.

References Cited by the Examiner

UNITED STATES PATENTS

| | | | |
|---|---|---|---|
| 2,052,910 | 9/36 | Veliers. | |
| 2,582,681 | 1/52 | Coe | 346—8 |
| 2,614,327 | 10/52 | Russell | 33—1 |
| 2,651,400 | 9/53 | Young | 346—29 |
| 2,750,248 | 6/56 | Abraham | 346—8 |
| 2,804,616 | 8/57 | Pierce | 346—29 |
| 2,843,935 | 7/58 | Gerber | 33—1 |
| 2,907,623 | 10/59 | Parenti | 33—1 X |
| 2,922,332 | 1/60 | Lentz et al. | 33—1 X |
| 2,999,315 | 9/61 | Benson | 33—1 |

FOREIGN PATENTS

| | | |
|---|---|---|
| 186,002 | 6/56 | Austria. |

ISAAC LISANN, *Primary Examiner.*

LOUIS R. PRINCE, *Examiner.*

UNITED STATES PATENT OFFICE

CERTIFICATE OF CORRECTION

Patent No. 3,186,090 June 1, 1965

Heinz Joseph Gerber

It is hereby certified that error appears in the above numbered patent requiring correction and that the said Letters Patent should read as corrected below.

Column 9, line 34, after "198" insert -- which function to supply a full wave rectified voltage to the line 200. The line 200 is in turn connected to one --; column 14, line 9, for "hirlines" read -- hairlines --; column 16, line 37, for "thereo" read -- thereto --; column 18, line 36, for "a", first occurrence, read -- said --; column 20, lines 32 and 33, strike out "which function to supply a full wave rectified voltage to the line 200. The line 200 is in turn connected to one".

Signed and sealed this 12th day of October 1965.

(SEAL)
Attest:

ERNEST W. SWIDER
Attesting Officer

EDWARD J. BRENNER
Commissioner of Patents